United States Patent
Motai

[15] 3,652,370
[45] Mar. 28, 1972

[54] DAZZLE-PREVENTING AND HEAT-BLOCKING GLASS SHEET

[72] Inventor: Hirokazu Motai, Nishinomiya-shi, Japan

[73] Assignee: Nippon Sheet Glass Co., Ltd., Osaka, Japan

[22] Filed: Oct. 7, 1969

[21] Appl. No.: 864,390

[30] Foreign Application Priority Data

Oct. 12, 1968 Japan....................43/89250

[52] U.S. Cl...............161/2, 117/23, 117/25, 117/40, 117/125, 161/5, 161/6, 161/38, 161/162, 161/165, 161/193, 161/408
[51] Int. Cl..............................B44f 1/00
[58] Field of Search..............161/5–6, 162, 193, 161/408, 1, 2, 3.5, 165, 38; 117/23, 25, 40, 125, 33.3, 33.4, 40; 350/1, 164, 166; 156/63, 100; 65/60

[56] References Cited

UNITED STATES PATENTS

| | | | |
|---|---|---|---|
| 2,009,167 | 7/1935 | DeLano | 156/100 X |
| 3,078,693 | 2/1963 | Lytle | 65/60 |
| 3,354,025 | 11/1967 | Aykanian | 156/100 X |
| 3,502,022 | 3/1970 | Wood | 117/23 X |

*Primary Examiner*—Harold Ansher
*Assistant Examiner*—D. J. Fritsch
*Attorney*—Wenderoth, Lind & Ponack

[57] ABSTRACT

A dazzle-preventing and heat-blocking glass sheet capable of allowing a view of outside objects without any trouble, said glass sheet having a number of small fragments of glass color adhered thereto at one surface of an area to be protected from dazzle and heat to absorb considerable amounts of visible rays and heat rays from outside, said glass color fragments being arranged in a spaced-apart relationship forming a pattern to allow outside objects to be viewed with sufficient clearness through the interspaces among the glass color fragments.

3 Claims, 5 Drawing Figures

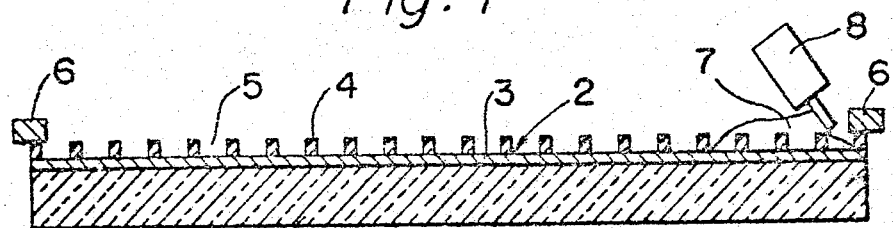
Fig. 1
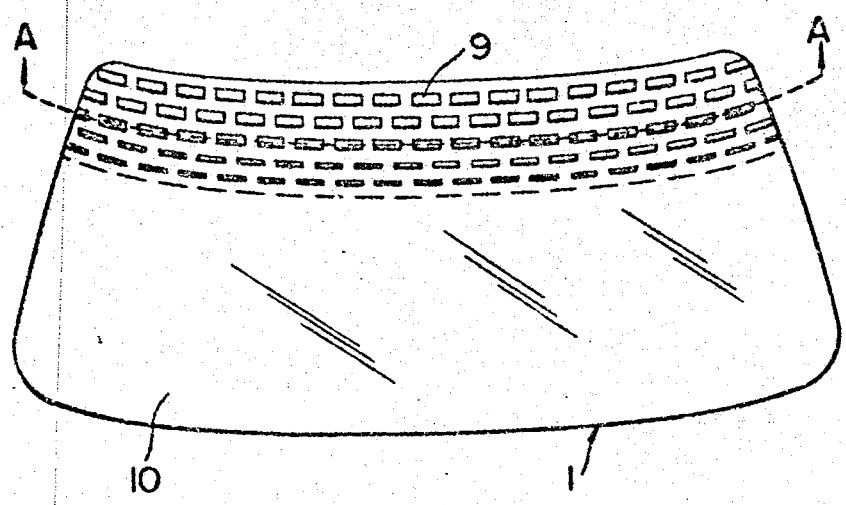
Fig. 2
Fig. 3
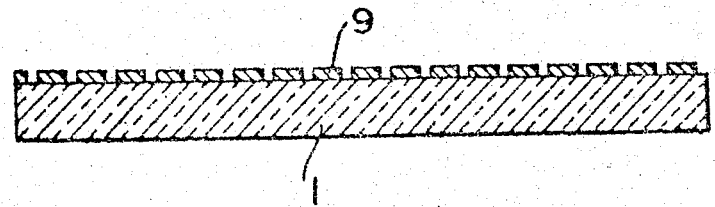
HIROKAZU MOTAI, Inventor

DAZZLE-PREVENTING AND HEAT-BLOCKING GLASS SHEET

This invention relates to a dazzle-preventing and heat-blocking glass sheet particularly suited for use in vehicles and for architectural purposes.

Heretofore, a glass sheet whose upper part is colored semitransparent has been used as, for instance, a windshield of an automobile for dazzle-preventing and heat-blocking purposes. This colored windshield glass is usually produced by interposing a film of an organic polymeric material such as polyvinyl butyral, the upper part of which film has been colored with a dyestuff, between two ordinary transparent glass sheets; and bonding the interposed film with both glass sheets to form a laminated glass sheet. This partially colored windshield glass serves for dazzle-prevention and heat-blocking due to absorption of visible rays and heat rays by the colored layer and also provides visibility of outside objects such as traffic signals through the colored part. A laminated glass of such structure has the disadvantages such as a poor resistance to color fading, the complexity of the productional process and a high cost of production. According to another proposal, a metal oxide is deposited on a part of a glass sheet or a metal is vacuum deposited thereon to form a semitransparent colored layer directly. The colored layer obtained by such method, however, has so large a light reflectance as to dazzle a driver of a vehicle running nearby. It also has the disadvantage that a desirable color is difficult to obtain and an adhesive force between the colored layer and the glass sheet is small. Accordingly, such glass has hardly been put into practice for use as window glass of vehicles.

An object of the present invention is to provide a novel dazzle-preventing and heat-blocking glass sheet free from the above-mentioned defects which allows a sufficiently clear and wide view of outside objects.

According to the present invention, there is provided a dazzle-preventing and heat-blocking glass sheet capable of allowing a view of outside objects without any trouble, said glass sheet having a number of small fragments of glass color adhered thereto at one surface of an area to be protected from dazzle and heat to absorb considerable amounts of visible rays and heat rays from outside, said glass color fragments being arranged in a spaced-apart relationship forming a pattern to allow outside objects to be viewed with sufficient clearness through the interspaces among the glass color fragments.

The invention will be described with reference to the accompanying drawings in which:

FIG. 1 is a view showing the production of the dazzle-preventing and heat-blocking glass sheet of the present invention;

FIG. 2 is a front elevation of one embodiment of the dazzle-preventing and heat-blocking glass sheet of the present invention;

FIG. 3 is a sectional view taken along the line A—A of FIG. 2;

Figure 4:
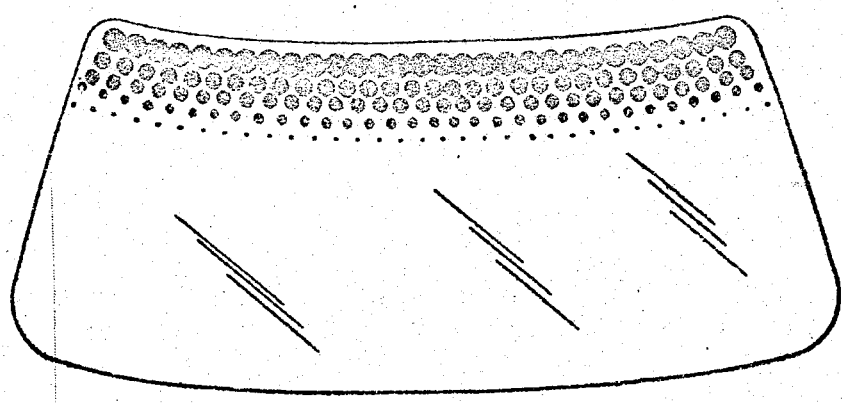
FIG. 4 is a front elevation of another embodiment of the dazzle-preventing and heat-blocking glass sheet of the invention used as a windshield glass of an automobile; and, FIG. 5 is a front elevation of another embodiment of the dazzle-preventing and heat-blocking glass sheet of the invention used as a rear windowpane of an automobile.

The glass color used in the present invention is also termed glass enamel and is a low-melting glass having dispersed therein fine particles of a pigment consisting of inorganic oxides as coloring agents. As the low-melting glass, glass which melts and becomes tacky at temperatures in the range of about 300° to 650° C. is used. A preferable low-melting glass is a lead-borate-silicate glass, for instance, one consisting of 10 percent by weight of $B_2O_3$, 85 percent by weight of PbO and 5 percent by weight of $SiO_2$. Usable as the coloring agent is a pigment consisting predominantly of metal oxides. The small fragments of glass color used in the present invention are non-transparent or semitransparent, those having a light transmittance of 0 to 40 percent being preferable.

The shape of a small fragment of the glass color used in this invention may be any such as a square, rectangle, circle and ellipse. The size of each of said small fragments is far smaller than the area of a glass sheet to be covered with them, and is difficult to define on a general basis. Usually, the typical length (for instance, a diameter in the case of a circle) of one small fragment is about 0.1 to 20 mm. The interval between small fragments is also difficult to define, but is about 0.1 to 10 mm. In an extreme case, however, these fragments may come into contact with one another at their periphery.

The dazzle-preventing and heat-blocking glass sheet of the present invention consists of an ordinary transparent glass sheet, to one surface of which a number of small fragments of glass color are adhered by the deposition process, these many small fragments of glass color being so arranged on the glass sheet that interspaces exist among the small fragments and all of the fragments together form some pattern. When outside objects are viewed through such glass sheet, they can be clearly seen through a transparent portion of the glass sheet in the interspaces among the fragments. On the other hand, a part of the glass sheet covered with the glass color fragments absorbs considerable amounts of visible rays and heat rays coming from outside, thus achieving dazzle-preventing and heat-blocking effects.

The desired degree of dazzle-prevention and heat-blocking can be attained by controlling a covering ratio of that area of a glass sheet which is covered by fragments of glass color and the visible light transmittance and heat ray absorption ratio of each fragment.

It is not altogether necessary that the arrangement of fragments of glass color should be uniform. For instance, when the glass sheet of the invention is used as a windshield of an automobile, it is primarily an upper part of the windshield glass that need be prevented from dazzling, and the lower part need be less dazzle-preventing. Rather, for securing a clear and wide view during driving, the lower part should better be without a covering of glass color fragments. Hence, in such a case, glass color fragments are arranged in such a manner that a ratio of covering is large at the upper part of the windshield glass and gets gradually smaller downwards, and that below some point, it becomes zero. According to one embodiment of realizing such arrangement, glass color fragments of a larger size are arranged at relatively small intervals in the upper part, and smaller fragments are used at larger intervals as they go downwards. This variation takes place continuously until no fragments are adhered below a certain boundary. The same object can be achieved by a manner of arrangement in which the size of the fragments is made gradually smaller while the intervals between them are being maintained constant. In these arrangements, there is obtained a vignetting effect in a transient boundary between an area where the glass color fragments are adhered and an area where they are not, and this constitutes an esthetic advantage. The esthetic advantage can also be obtained by selecting the shapes of glass color fragments.

The production of the dazzle-preventing and heat-blocking glass of the present invention as a windshield glass will be described with reference to the accompanying drawings.

Referring to FIG. 1, the surface of a flat glass sheet 1 cut in the shape of a windshield of an automobile is cleansed with an alcohol or carbon tetrachloride. Thereafter, a silk-screen 2 is adhered intimately to the surface. The silk-screen 2 consists of a cloth 3 with 150–200 mesh and a resinous layer 4 intimately adhered thereto which defines apertures 5. The apertures 5 defined by the resinous layer 4 are so disposed that they form a pattern corresponding to one which glass color fragments may produce on a dazzle-preventing glass sheet product. Both sides of the silk-screen 2 are maintained by a wooden frame 6. While a dispersion 7 of glass color whose viscosity has been appropriately adjusted is being supplied, a squeegee 8 whose tip is made of rubber is moved in pressing contact with the surface of the silk-screen, thus applying the dispersion 7 of the glass color to the silk-screen 2. By so doing, the glass color dispersion 7 passes through the apertures 5 and the mesh of the cloth 3, and is printed on the surface of the glass sheet 1 forming the desired pattern. The dispersion of the glass color consists of a low-melting glass, a coloring material and minor amounts of additives. Examples of the additives are those for enhancing the water resistance of glass color, such as fluor-spar, sodium fluosilicate, zinc flower and potassium oxide and those for making the thermal expansion coefficient of a substrate glass sheet equal to that of glass color to be adhered, such as alumina, silicic acid and zinc flower. The dispersion is prepared by pulverizing these components in a pulverizer such as a ball mill and kneading the pulverized product together with such a dispersing medium as terepene oil. The glass color dispersion can also be spray-coated on the silk-screen. In this case, a glass color dispersion prepared in the above-mentioned manner is used after diluting it with a suitable volatile solvent. The thickness of a layer of the adhered glass color dispersion can be adjusted depending upon such factors as the size of mesh of the cloth 3, the viscosity of the glass color dispersion and the number of coating operations done with a squeegee.

The glass sheet 1 so printed with the desired pattern is dried for 20 to 60 minutes at 70° to 150° C. to evaporate the dispersion medium and solvent contained in the glass color. Simultaneously with the deposition of glass color, the glass sheet 1 is subjected to a bending treatment and then quenched to strengthen it. Generally, the deposition of glass color can be effected at lower temperatures, for instance, 550° to 650° C., it is advantageous to perform both the deposition of glass color and the bending treatment of the glass sheet simultaneously at a temperature of about 700° C. The glass sheet 1 can be bended by the conventional self-weight bending or press bending. At this time, a pattern formed by glass color can be deposited without undergoing any deformation due to a press plate. An example of the so produced dazzle-preventing and heat-blocking windshield glass is shown in FIGS. 2 and 3. In FIG. 2, fragments 9 are of a rectangular shape. One fragment at the uppermost part of the glass sheet 1 is 8 mm. long and 1 mm. wide, and the distance between adjacent fragments is 1 mm. The width of a glass color fragment becomes gradually smaller downwards. The lower part 10 of the glass plate no longer contains fragments. The dazzle-preventing and heat-blocking glass sheet having such arrangement of glass color fragments can have imparted thereto a sufficient dazzle-preventing and heat-blocking effect owing to the glass color fragments and yet permit a view of outside objects through the interspaces among the glass color fragments to an entirely satisfactory degree.

Figure 5:
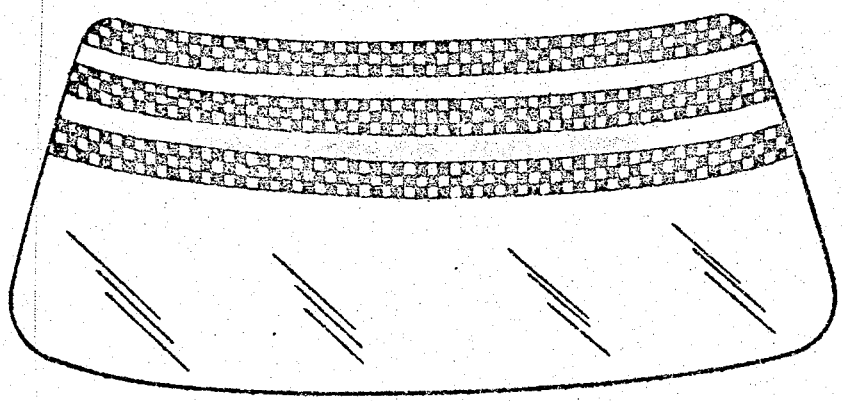

FIG. 4 shows another embodiment of a dazzle-preventing and heat-blocking windshield glass of an automobile in which fragments of glass color are of a circular shape. At the uppermost row, the circular fragments are arranged in contact with one another. They get smaller as they go downward, and the intervals among these fragments become larger. FIG. 5 shows one example of a heat-blocking rear windowpane of an automobile which provides heat-blocking properties for a person sitting at a rear seat and allows the driver to view outside objects through it via a room mirror.

In the dazzle-preventing and heat-blocking glass of the present invention, an adhesive force between glass color fragments and the glass sheet is excellent, and its resistance to color fading is great because of using a pigment consisting of inorganic oxides. Also, it is chemically durable against detergents for glass. Also it can be produced at low cost because it is not necessary to form a laminated glass sheet. Furthermore, when the dazzle-preventing and heat-blocking glass sheet of the present invention is strengthened by a quenching treatment, it is possible to obtain a strengthened glass sheet having a strength comparable to that of an ordinary strengthened glass. The dazzle-preventing and heat-blocking glass of the present invention having such excellent characteristics has utility not only as windshield of an automobile, but also as a rear windowpane of an automobile and for aircraft, trains, general vehicles and also for architectural purposes.

We claim:

1. A dazzle-preventing and heat-blocking glass sheet for use in vehicles and capable of allowing a view of outside objects without any trouble, said glass sheet having a number of small fragments of glass color adhered thereto at one surface of an area to be protected from dazzle and heat to absorb considerable amounts of visible rays and heat rays from outside, said glass color fragments being arranged in a spaced-apart relationship forming a pattern, the interspaces among the glass color fragments providing means to view outside objects with satisfactory clearness, the typical length of said fragments being about 0.1 to 20 mm. and the interval between fragments being about 0.1 to 10 mm.

2. The dazzle-preventing and heat-blocking glass sheet for use in vehicles according to claim 1 wherein the area of each of the glass color fragments gets smaller progressively from one end of the glass sheet to the other until there is an area of the glass sheet at some distance apart from said one end in which no glass color fragments exist, a vignetting effect being obtained at a boundary between an area where small fragments of glass color are present on the glass sheet and the area where there are no fragments.

3. The dazzle-preventing and heat-blocking glass sheet for use in vehicles according to claim 2, wherein the interval between the glass color fragments is made gradually greater from said one end of the glass to said other end.

* * * * *